(12) United States Patent
Fu et al.

(10) Patent No.: US 12,402,138 B2
(45) Date of Patent: Aug. 26, 2025

(54) METHOD AND DEVICE FOR RECEIVING PHYSICAL DOWNLINK SHARED CHANNEL

(71) Applicant: Samsung Electronics Co., Ltd., Suwon-si (KR)

(72) Inventors: Jingxing Fu, Beijing (CN); Feifei Sun, Beijing (CN); Yi Wang, Beijing (CN); Sa Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 17/697,127

(22) Filed: Mar. 17, 2022

(65) Prior Publication Data

US 2022/0304041 A1 Sep. 22, 2022

(30) Foreign Application Priority Data

Mar. 19, 2021 (CN) .......................... 202110297846.6
Apr. 2, 2021 (CN) .......................... 202110362062.7

(51) Int. Cl.
*H04W 72/12* (2023.01)
*H04L 1/18* (2023.01)
(Continued)

(52) U.S. Cl.
CPC ........... *H04W 72/23* (2023.01); *H04L 1/1812* (2013.01); *H04L 1/1854* (2013.01); *H04L 1/1861* (2013.01); *H04L 5/0053* (2013.01)

(58) Field of Classification Search
CPC .......................... H04W 72/23; H04W 72/1273; H04L 1/1854; H04L 1/1812; H04L 1/1861;
(Continued)

(56) References Cited

U.S. PATENT DOCUMENTS

2014/0086137 A1 3/2014 Chen
2020/0008097 A1 1/2020 Fujishiro et al.
(Continued)

OTHER PUBLICATIONS

IP.com Feedback Enhancements for Semi-Persistent Downlink Transmissions in Ultra-Reliable Low-Latency Communication Jun. 1, 2020 (Year: 2020).*

(Continued)

*Primary Examiner* — Kwang B Yao
*Assistant Examiner* — Patrick Yipao Pei
(74) *Attorney, Agent, or Firm* — Jefferson IP Law, LLP

(57) ABSTRACT

The disclosure relates to a 5G or 6G communication system for supporting a higher data transmission rate. A method performed by a user equipment (UE) is provided. The method includes receiving, from a base station, a message including configuration information of a hybrid automatic repeat request (HARQ)-acknowledgement (ACK) feedback mode for a multicast semi-persistent scheduling (SPS) physical downlink shared channel (PDSCH) without physical downlink control channel (PDCCH) scheduling, receiving, from the base station, downlink control information (DCI) for activation of the multicast SPS PDSCH without PDCCH scheduling, receiving, from the base station, the multicast SPS PDSCH without PDCCH scheduling based on the activation of the multicast SPS PDSCH without PDCCH scheduling, and transmitting, to the base station, HARQ-ACK information for reception of the multicast SPS PDSCH without PDCCH based on the HARQ-ACK feedback mode for the multicast SPS PDSCH without PDCCH scheduling.

15 Claims, 17 Drawing Sheets

(51) Int. Cl.
   *H04L 1/1812* (2023.01)
   *H04L 1/1829* (2023.01)
   *H04L 5/00* (2006.01)
   *H04W 72/23* (2023.01)

(58) Field of Classification Search
   CPC ..... H04L 5/0053; H04L 5/001; H04L 1/1864; H04L 5/0055; H04L 5/0098; H04L 2001/0093
   See application file for complete search history.

(56) References Cited

U.S. PATENT DOCUMENTS

| | | | |
|---|---|---|---|
| 2021/0243782 A1* | 8/2021 | Miao | H04L 5/0091 |
| 2022/0007399 A1* | 1/2022 | Rastegardoost | H04L 5/0055 |
| 2022/0278809 A1* | 9/2022 | Papasakellariou | H04L 1/1614 |
| 2023/0189243 A1* | 6/2023 | Li | H04W 4/06 370/329 |
| 2024/0073894 A1* | 2/2024 | Lei | H04L 1/1812 |

OTHER PUBLICATIONS

International Search Report dated Jun. 22, 2022, issued an International Application No. PCT/KR2022/003731.
Ericsson, 'Mechanisms to support MBS group scheduling for RRC_Connected UEs', R1-2101726, 3GPP TSG RAN WG1 Meeting #104-e; Jan. 19, 2021.
Vivo, 'Discussion on mechanisms to support group scheduling for RRC_Connected UEs', R1-2100469, 3GPP TSG RAN WG1 Meeting #104-e; Jan. 18, 2021.
ZTE, 'Discussion on mechanisms to Support Group Scheduling for RRC_Connected UEs', R1-2100106, 3GPP TSG RAN WG1 Meeting #104-e; Jan. 19, 2021.

* cited by examiner

METHOD AND DEVICE FOR RECEIVING PHYSICAL DOWNLINK SHARED CHANNEL

CROSS-REFERENCE TO RELATED APPLICATION(S)

This application is based on and claims priority under 35 U.S.C. § 119(a) of a Chinese patent application number 202110297846.6, filed on Mar. 19, 2021, in the Chinese Intellectual Property Office, and of a Chinese patent application number 202110362062.7, filed on Apr. 2, 2021, in the Chinese Intellectual Property Office, the disclosure of each of which is incorporated by reference herein in its entirety.

BACKGROUND

1. Field

The disclosure relates to the technical field of wireless communication. More particularly, the disclosure relates to a method and device for receiving a Physical Downlink Shared Channel (PDSCH).

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The transmission from base station to User Equipment (UE) is called downlink, and the transmission from UE to base station is called uplink. Hybrid automatic repeat request (HARQ)-acknowledgement (ACK) information of Physical Downlink Shared Channel (PDSCH) can be transmitted in Physical Uplink Shared Channel (PUSCH) or physical uplink control channel (PUCCH), and PDSCH is scheduled by Downlink Control Information (DCI) transmitted by Physical Downlink Control Channel (PDCCH).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for receiving a PDSCH.

Another aspect of the disclosure is to provide a PDSCH receiving method, which includes receiving configuration information of semi-persistent scheduling SPS PDSCH and bandwidth part BWP configuration, and receiving SPS PDSCH based on the configuration information of SPS PDSCH and the BWP configuration.

Another aspect of the disclosure is to provide a PDSCH receiving method, wherein the BWP configuration includes switching indication information of BWP, and receiving SPS PDSCH based on the configuration information of SPS PDSCH and the BWP configuration includes receiving SPS PDSCH based on the configuration information of SPS PDSCH and the switching indication information of BWP.

Another aspect of the disclosure is to provide a PDSCH receiving method, wherein receiving SPS PDSCH based on the configuration information of SPS PDSCH and the BWP configuration includes determining that an active BWP is to be switched from a type 1 BWP A to a type 1 BWP B according to the configuration information of SPS PDSCH and the BWP configuration, and frequency domain resources of the type 2 PDSCH are included in the type 1 BWP A and the type 1 BWP B, after the active BWP is switched from the type 1 BWP A to the type 1 BWP B, receiving the type 2 SPS PDSCH in the type 1 BWP B by using the configuration of the type 2 SPS PDSCH in the type 1 BWP A.

Another aspect of the disclosure is to provide a PDSCH receiving method, wherein the configuration information of the type 2 SPS PDSCH is configured according to the frequency domain resources of the type 2 PDSCH.

Another aspect of the disclosure is to provide a PDSCH receiving method, wherein the receiving of the type 2 SPS PDSCH is stopped in the process of switching the active BWP from the type 1 BWP A to the type 1 BWP B.

Another aspect of the disclosure is to provide a PDSCH receiving method, wherein receiving SPS PDSCH based on the configuration information of SPS PDSCH and the BWP configuration includes determining that an active BWP is to be switched from a type 1 BWP A to a type 1 BWP B according to the configuration information of SPS PDSCH and the BWP configuration, and frequency domain resources of the type 2 PDSCH are included in the type 1 BWP A and the type 1 BWP B, after the active BWP is switched from the type 1 BWP A to the type 1 BWP B, not receiving the type 2 SPS PDSCH in the type 1 BWP B.

Another aspect of the disclosure is to provide a PDSCH receiving method, wherein receiving SPS PDSCH based on the configuration information of SPS PDSCH and the BWP configuration includes determining that a currently active BWP is BWP A, receiving the type 2 SPS PDSCH on the type 2 BWP F corresponding to the type 1 BWP A according to the configuration information of SPS PDSCH and the BWP configuration, determining that the active BWP is to be switched from the type 1 BWP A to the type 1 BWP B, and the type 2 BWP F corresponds to the type 1 BWP B, after the active BWP is switched from the type 1 BWP A to the type 1 BWP B, the type 2 SPS PDSCH is received in the type 2 BWP F.

Another aspect of the disclosure is to provide a PDSCH receiving method, wherein the configuration information of the type 2 SPS PDSCH is configured according to the type 2 BWP.

Another aspect of the disclosure is to provide a PDSCH receiving method, wherein the receiving of the type 2 SPS PDSCH in the type 2 BWP F is stopped during the process of switching the active BWP from the type 1 BWP A to the type 1 BWP B.

Additional aspects will be set forth in part in the description which follows and, in part, will be apparent from the description, or may be learned by practice of the presented embodiments.

In accordance with an aspect of the disclosure, a PDSCH receiving method is provided. The PDSCH receiving method includes determining the transmission mode of the hybrid automatic repeat request response HARQ-ACK information of SPS PDSCH, wherein determining the transmission mode of the hybrid automatic repeat request response HARQ-ACK information of SPS PDSCH comprises determining that the transmission mode of the HARQ-ACK information of the type 2 PDSCH is a first transmission mode, and transmitting the HARQ-ACK information of the type 2 PDSCH according to the first transmission mode, determining that the transmission mode of the HARQ-ACK information of the type 2 SPS PDSCH is a second transmission mode, and transmitting the HARQ-ACK information of the type 2 SPS PDSCH according to the second transmission mode, wherein the first transmission mode and the second transmission mode are selected from NACK only mode and ACK/NACK mode.

In accordance with another aspect of the disclosure, a PDSCH receiving method is provided. The PDSCH receiving method includes determining the transmission mode of hybrid automatic repeat request response HARQ-ACK information of SPS PDSCH, wherein, determining the transmission mode of the hybrid automatic repeat request response HARQ-ACK information of SPS PDSCH includes determining that the transmission mode of the HARQ-ACK information of the type 2 SPS PDSCH and the transmission mode of the HARQ-ACK information of an activated SPS PDSCH of the type 2 SPS PDSCH are a third transmission mode, and transmitting the HARQ-ACK information of the type 2 SPS PDSCH and the HARQ-ACK information of the activated SPS PDSCH of the type 2 SPS PDSCH according to the third transmission mode, determining that the transmission modes of HARQ-ACK information for an active SPS PDSCH of the type 2 SPS PDSCH and the HARQ-ACK information of SPS PDSCH releasing DCI are a fourth transmission mode, and transmitting the HARQ-ACK information for the active SPS PDSCH of the type 2 SPS PDSCH and the HARQ-ACK information of SPS PDSCH releasing DCI according to the fourth transmission mode, wherein the third transmission mode and the fourth transmission mode are selected from NACK only mode and ACK/NACK mode.

In accordance with another aspect of the disclosure, a PDSCH receiving method is provided. The method includes receiving activation information of SPS PDSCH, wherein the activation information of the type 2 SPS PDSCH is in a DCI format for scheduling the type 2 PDSCH, and CRC of the DCI format is scrambled by a first RNTI.

In accordance with another aspect of the disclosure, a PDSCH receiving method is provided. The method includes receiving activation information of SPS PDSCH, wherein the activation information of the type 2 SPS PDSCH is in a DCI format for scheduling the type 1 PDSCH, and CRC of the DCI format is scrambled by a UE specific RNTI.

In accordance with another aspect of the disclosure, a PDSCH receiving method is provided. The method includes receiving deactivation information of SPS PDSCH, and stopping receiving the SPS PDSCH according to the deactivation information, wherein the deactivation information of the type 2 SPS PDSCH is in a DCI format for scheduling the type 2 PDSCH, and CRC of the DCI format is scrambled by a first RNTI, or the deactivation information of the type 2 SPS PDSCH is in a DCI format for scheduling the type 1 PDSCH, and CRC of the DCI format is scrambled by a second RNTI, and/or the deactivation information includes a field in the DCI of the type 1 SPS PDSCH, which is used to indicate a deactivated type 2 SPS PDSCH and/or type 1 SPS PDSCH.

In accordance with another aspect of the disclosure, a PDSCH receiving method is provided. The method includes receiving the deactivation information of SPS PDSCH, and stopping receiving the SPS PDSCH according to the deactivation information, wherein the deactivation information of the type 2 SPS PDSCH is in a DCI format for scheduling the type 1 PDSCH, and CRC of the DCI format is scrambled by a third RNTI.

In accordance with another aspect of the disclosure, a UE that performs a method of receiving a PDSCH is provided. The UE includes a transceiver configured to receive configuration information of SPS PDSCH and bandwidth part BWP configuration, and a controller configured to receive SPS PDSCH based on the configuration information of SPS PDSCH and switching indication information of the BWP configuration.

In accordance with another aspect of the disclosure, a method performed by a UE is provided. The method includes receiving, from a base station, a message including configuration information of a HARQ-ACK feedback mode for a multicast SPS PDSCH without PDCCH scheduling, receiving, from the base station, downlink control information (DCI) for activation of the multicast SPS PDSCH without PDCCH scheduling, receiving, from the base station, the multicast SPS PDSCH without PDCCH scheduling based on the activation of the multicast SPS PDSCH without PDCCH scheduling, and transmitting, to the base station, HARQ-ACK information for reception of the multicast SPS PDSCH without PDCCH based on the HARQ-ACK feedback mode for the multicast SPS PDSCH without PDCCH scheduling.

In accordance with another aspect of the disclosure, a method performed by a base station is provided. The method includes transmitting, to a UE, a message including configuration information of a HARQ-ACK feedback mode for a multicast SPS PDSCH without PDCCH scheduling, transmitting, to the UE, downlink control information (DCI) for activation of the multicast SPS PDSCH without PDCCH scheduling, transmitting, to the UE, the multicast SPS PDSCH without PDCCH scheduling based on the activation of the multicast SPS PDSCH without PDCCH scheduling, and receiving, from the UE, HARQ-ACK information for reception of the multicast SPS PDSCH without PDCCH based on the HARQ-ACK feedback mode for the multicast SPS PDSCH without PDCCH scheduling.

In accordance with another aspect of the disclosure, a UE is provided. The UE includes a transceiver, and a controller configured to receive, from a base station via the transceiver, a message including configuration information of a HARQ-ACK feedback mode for a multicast SPS PDSCH without PDCCH scheduling, to receive, from the base station via the transceiver, downlink control information (DCI) for activation of the multicast SPS PDSCH without PDCCH scheduling, to receive, from the base station via the transceiver, the multicast SPS PDSCH without PDCCH scheduling based on the activation of the multicast SPS PDSCH without PDCCH scheduling, and to transmit, to the base station via the transceiver, HARQ-ACK information for reception of the multicast SPS PDSCH without PDCCH based on the HARQ-ACK feedback mode for the multicast SPS PDSCH without PDCCH scheduling.

In accordance with another aspect of the disclosure, a base station is provided. The base station includes a transceiver, and a controller configured to transmit, to a UE via the transceiver, a message including configuration information of a HARQ-ACK feedback mode for a multicast SPS PDSCH without PDCCH scheduling, to transmit, to the UE, via the transceiver, downlink control information (DCI) for activation of the multicast SPS PDSCH without PDCCH scheduling, to transmit, to the UE via the transceiver, the multicast SPS PDSCH without PDCCH scheduling based on the activation of the multicast SPS PDSCH without PDCCH scheduling, and to receive, from the UE via the transceiver, HARQ-ACK information for reception of the multicast SPS PDSCH without PDCCH based on the HARQ-ACK feedback mode for the multicast SPS PDSCH without PDCCH scheduling.

Another aspect of the disclosure is to provide an electronic device including a memory configured to store a computer program, and a processor configured to run the computer program to implement the method described in any one of the above aspects.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numbers will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
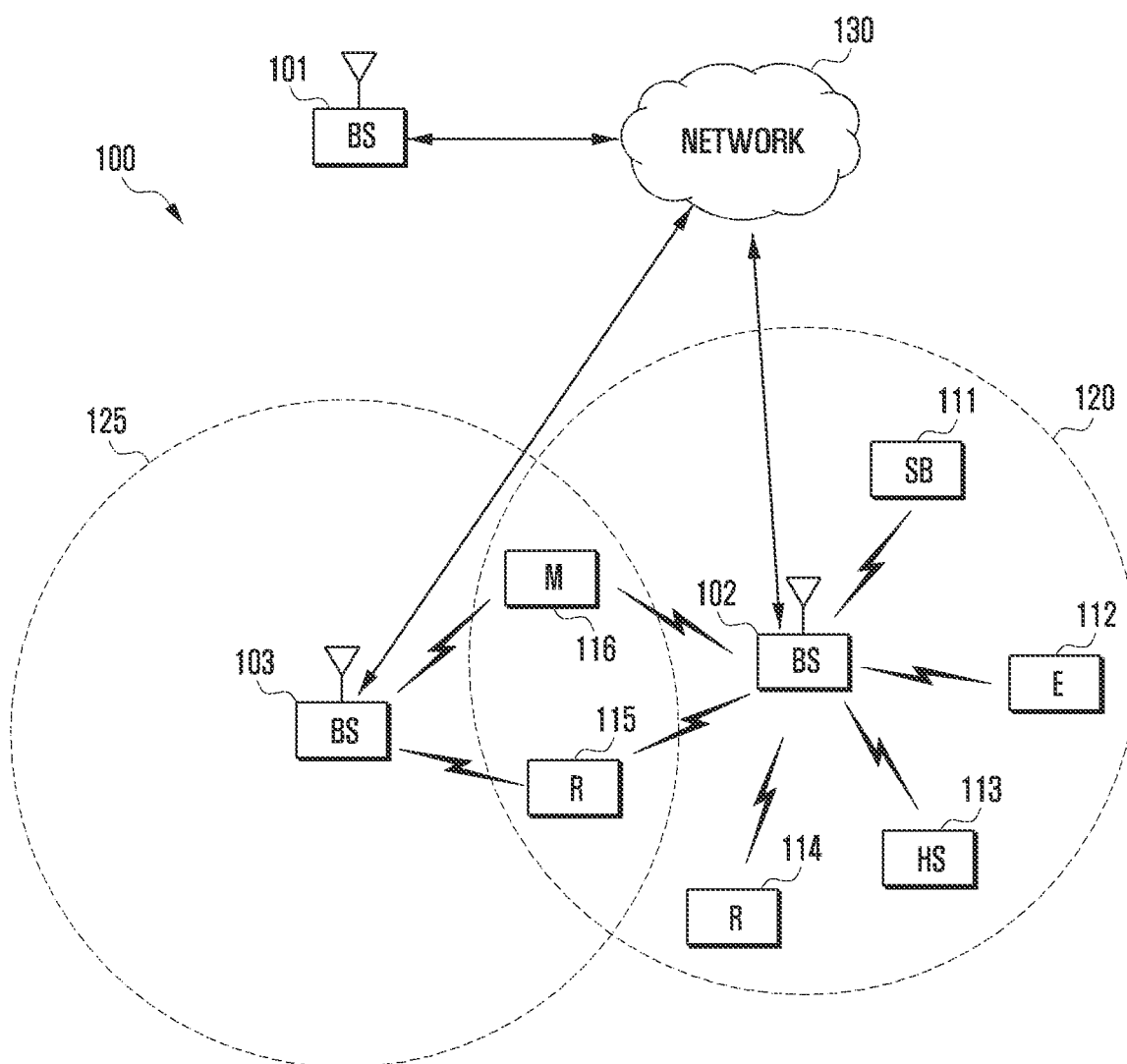
FIG. 1 shows a schematic diagram of an example wireless network 100 according to an embodiment of the disclosure.

FIG. 1 shows an example wireless network 100 according to an embodiment of the disclosure.

Referring to FIG. 1, the embodiment of the wireless network 100 shown is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless personal digital assistants (PDA), etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), long term evolution advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two-dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
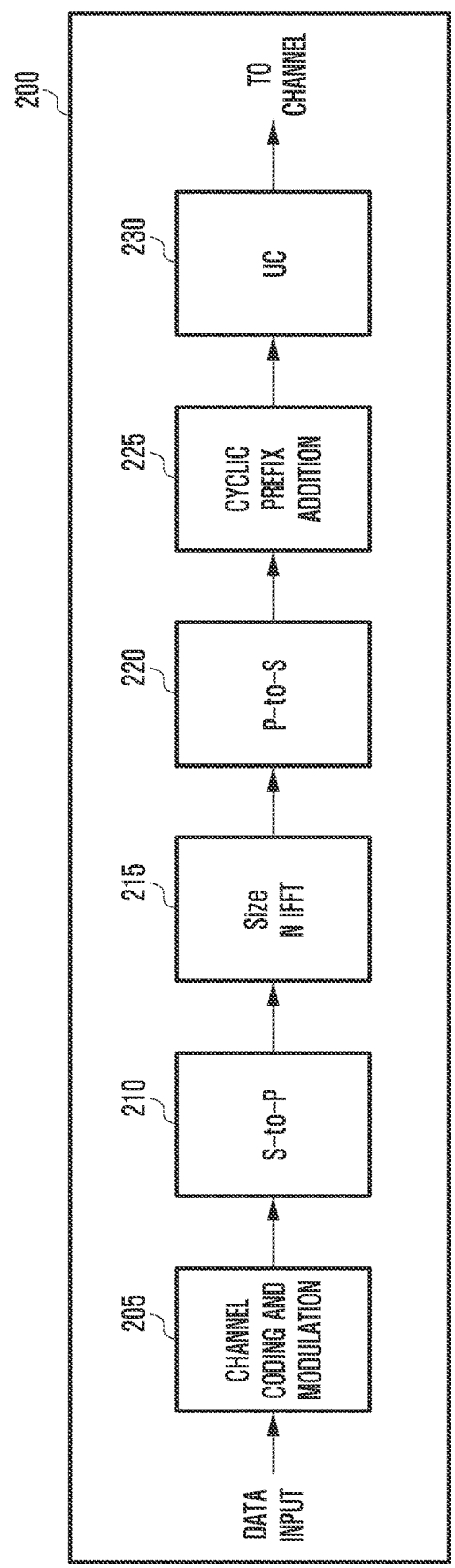
FIG. 2A shows a schematic diagram of an example wireless transmission path according to an embodiment of the disclosure.
Figure 2B:
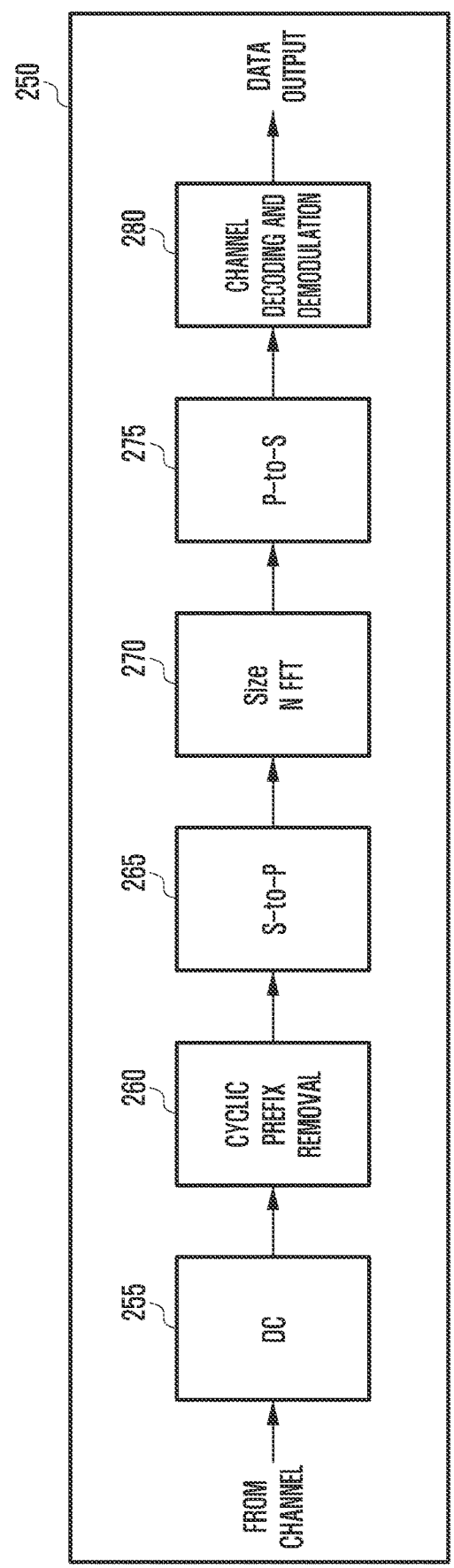
FIG. 2B shows a schematic diagram of an example wireless reception path according to an embodiment of the disclosure.

FIGS. 2A and 2B illustrate example wireless transmission and reception paths according to various embodiments of the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware.

Referring to FIGS. 2A and 2B, at least some of the components may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
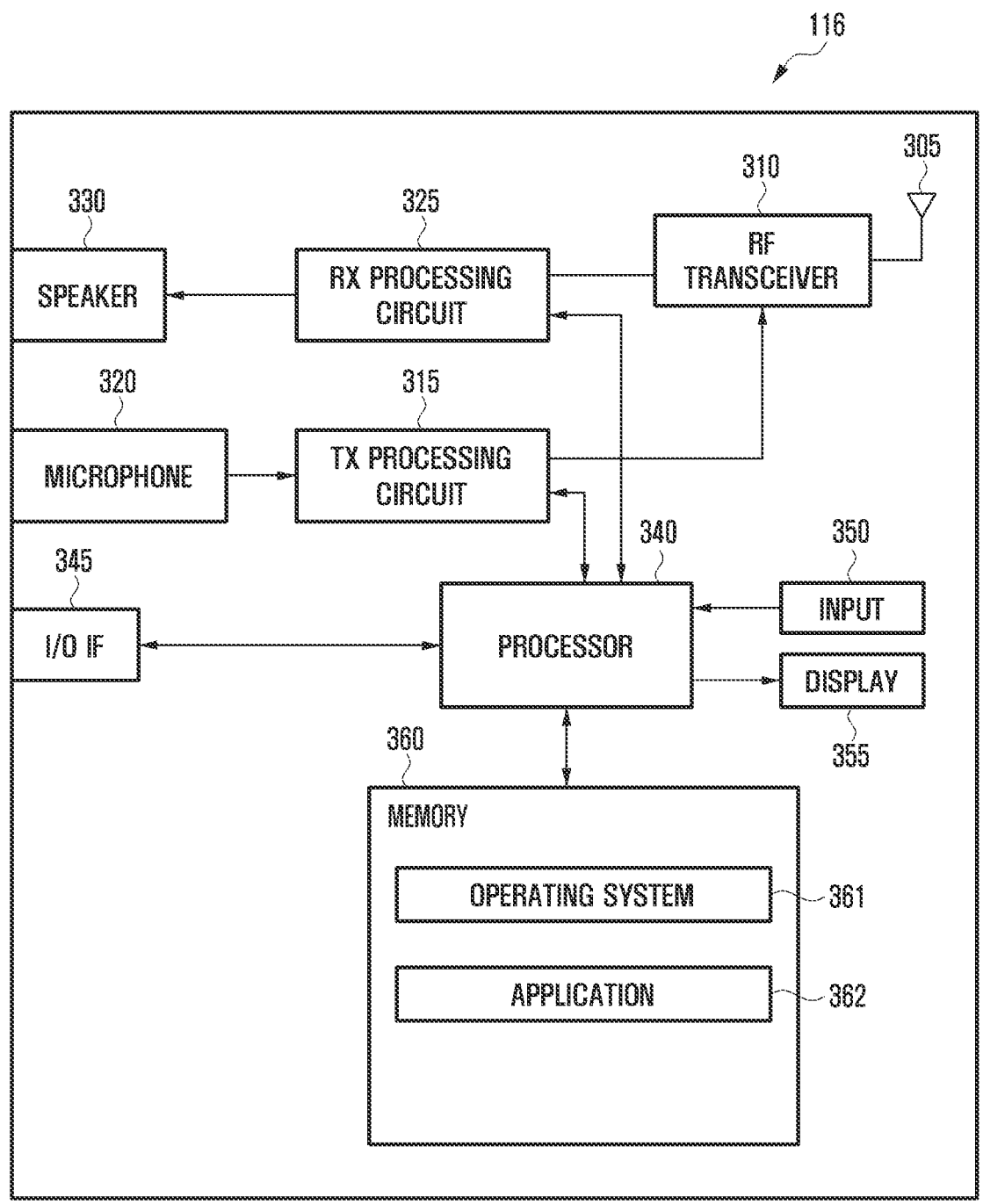
FIG. 3A shows a schematic diagram of an example UE 116 according to an embodiment of the disclosure.

FIG. 3A illustrates an example UE 116 according to an embodiment of the disclosure.

Referring to FIG. 3A, the embodiment of UE 116 shown is for illustration only, and UEs 111-115 of FIG. 1 can have the same or similar configuration. However, a UE has various configurations, and FIG. 3A does not limit the scope of the disclosure to any specific implementation of the UE.

The UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
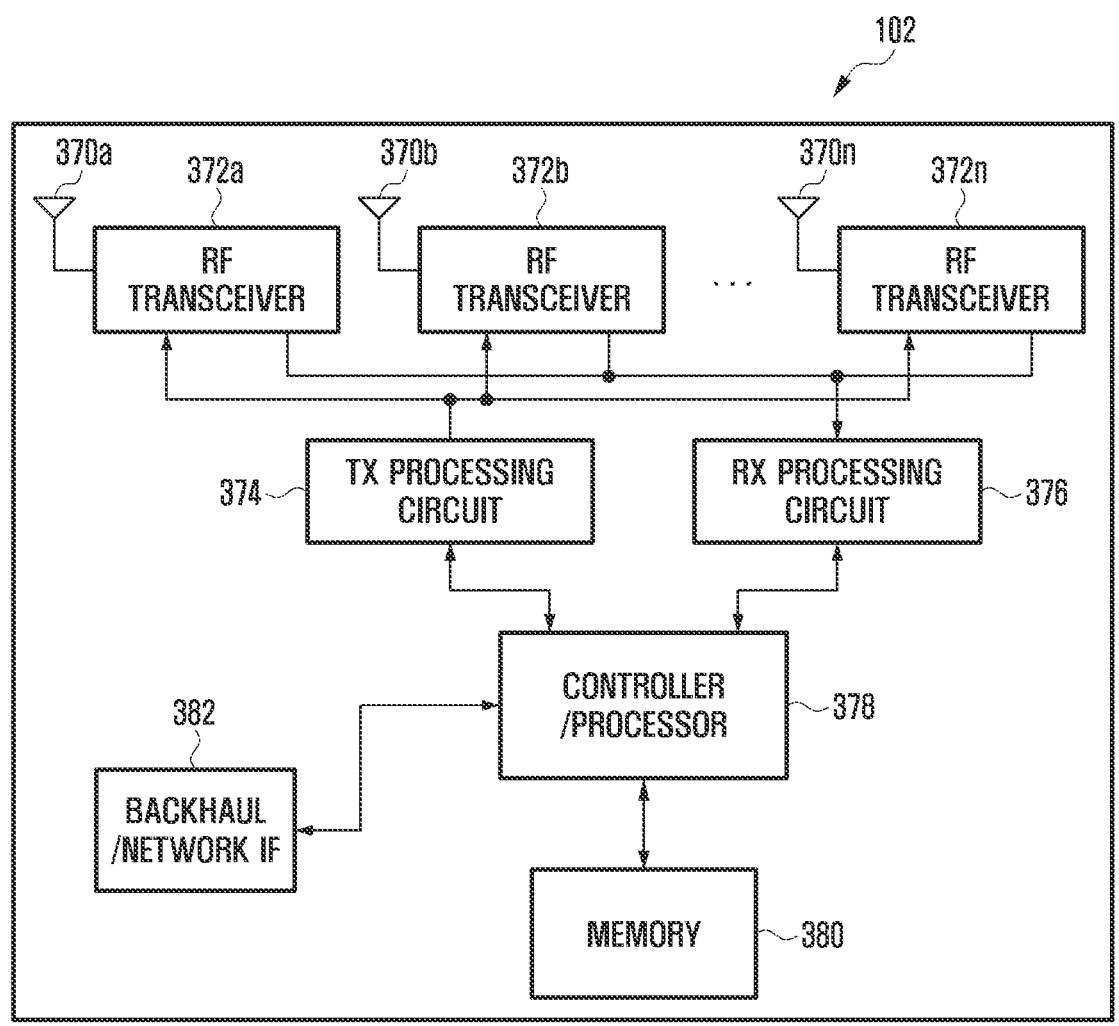
FIG. 3B shows a schematic diagram of an example gNB 102 according to an embodiment of the disclosure.

FIG. 3B illustrates an example gNB 102 according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370a, 370b ... 370n, a plurality of RF transceivers 372a, 372b ... 372n, a transmission (TX) processing circuit 374, and a reception (RX) processing circuit 376. In certain embodiments, one or more of the plurality of antennas 370a, 370b ... 370n include a 2D antenna array. gNB 102 also includes a controller/processor 378, a memory 380, and a backhaul or network interface 382.

The RF transceivers 372a, 372b ... 372n receive an incoming RF signal from antennas 370a, 370b ... 370n, such as a signal transmitted by UEs or other gNBs. RF transceivers 372a, 372b ... 372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a, 372b ... 372n receive the outgoing processed baseband or IF signal from TX processing circuit 374 and up-convert the baseband or IF signal into an RF signal transmitted via antennas 370a, 370b ... 370n.

The controller/processor 378 can include one or more processors or other processing devices that control the overall operation of gNB 102. For example, the controller/processor 378 can control the reception of forward channel signals and the transmission of backward channel signals through the RF transceivers 372a, 372b ... 372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a, 372b . . . 372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Various embodiments of the disclosure are further described below with reference to the accompanying drawings.

Figure 4:
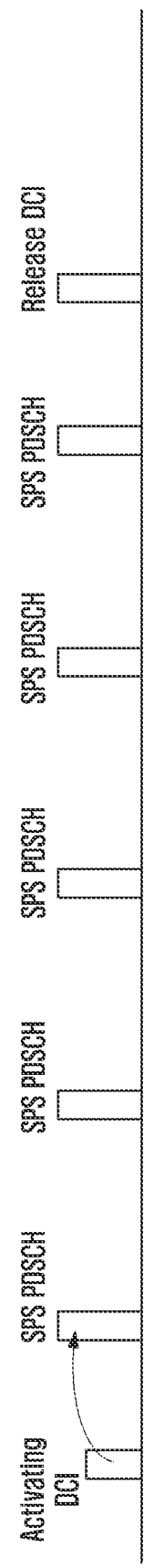
FIG. 4 shows a schematic diagram of semi-persistent scheduling SPS PDSCH according to an embodiment of the disclosure.

FIG. 4 shows a schematic diagram of semi-persistent scheduling SPS PDSCH according to an embodiment of the disclosure.

Referring to FIG. 4, a Semi-persistent Scheduling (SPS) is a scheduling in which SPS PDSCH transmits according to a certain period after SPS PDSCH is activated, and SPS PDSCH stops transmitting until SPS PDSCH is released.

Figure 5:
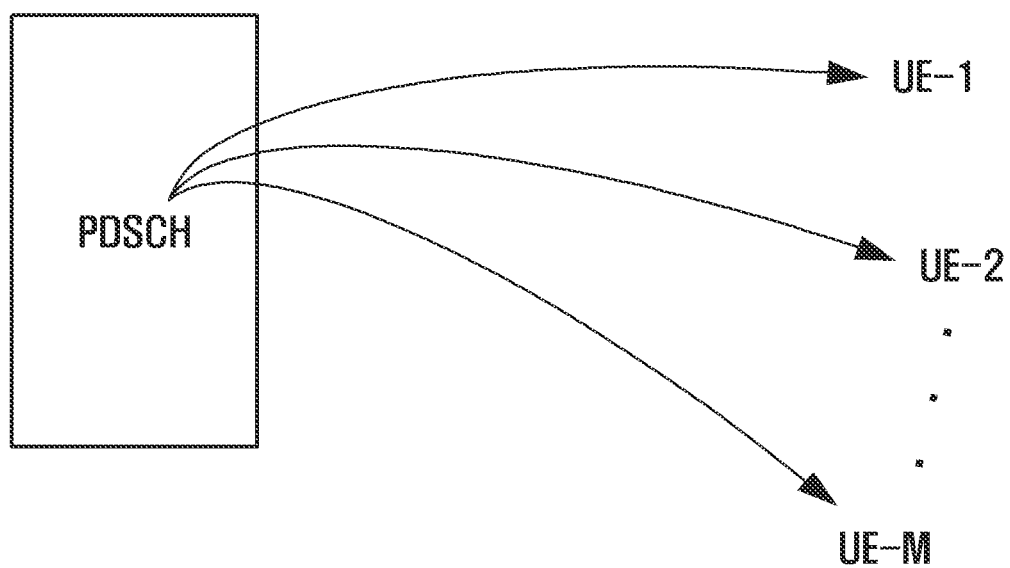
FIG. 5 shows a schematic diagram of multicast PDSCH and user equipment UE according to an embodiment of the disclosure.

FIG. 5 shows a schematic diagram of multicast PDSCH and user equipment UE according to an embodiment of the disclosure.

Referring to FIG. 5, a unicast PDSCH is a PDSCH received by one UE, and a multicast/groupcast PDSCH is a PDSCH received by more than one UE (UE-1, UE-2 . . . UE-M) at the same time.

The following expressions describe the receiving method of PDSCH with a type 1 PDSCH and a type 2 PDSCH. The type 1 PDSCH can be a unicast PDSCH and the type 2 PDSCH can be a multicast PDSCH.

Figure 6:
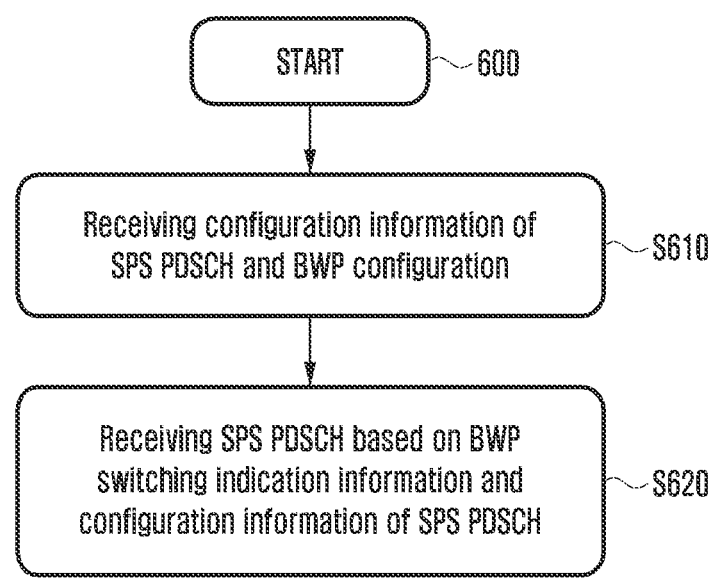
FIG. 6 shows a flowchart of a method 600 for starting to receive a physical downlink shared channel PDSCH according to an embodiment of the disclosure.

FIG. 6 shows a flowchart of a method 600 for starting to receive a physical downlink shared channel (PDSCH) according to an embodiment of the disclosure. The method 600 is implemented at the user equipment (UE) side.

Referring to FIG. 6, at operation S610 of the method 600, the UE may receive configuration information of SPS PDSCH and bandwidth part (BWP) configuration.

At operation S620, the UE may receive the SPS PDSCH based on the configuration information of the SPS PDSCH and the switching indication information of the BWP configuration.

The receiving method of PDSCH is described in the following two cases.

In the first case, frequency domain resources of the type 2 PDSCH are contained in the type 1 BWP.

Figure 7:
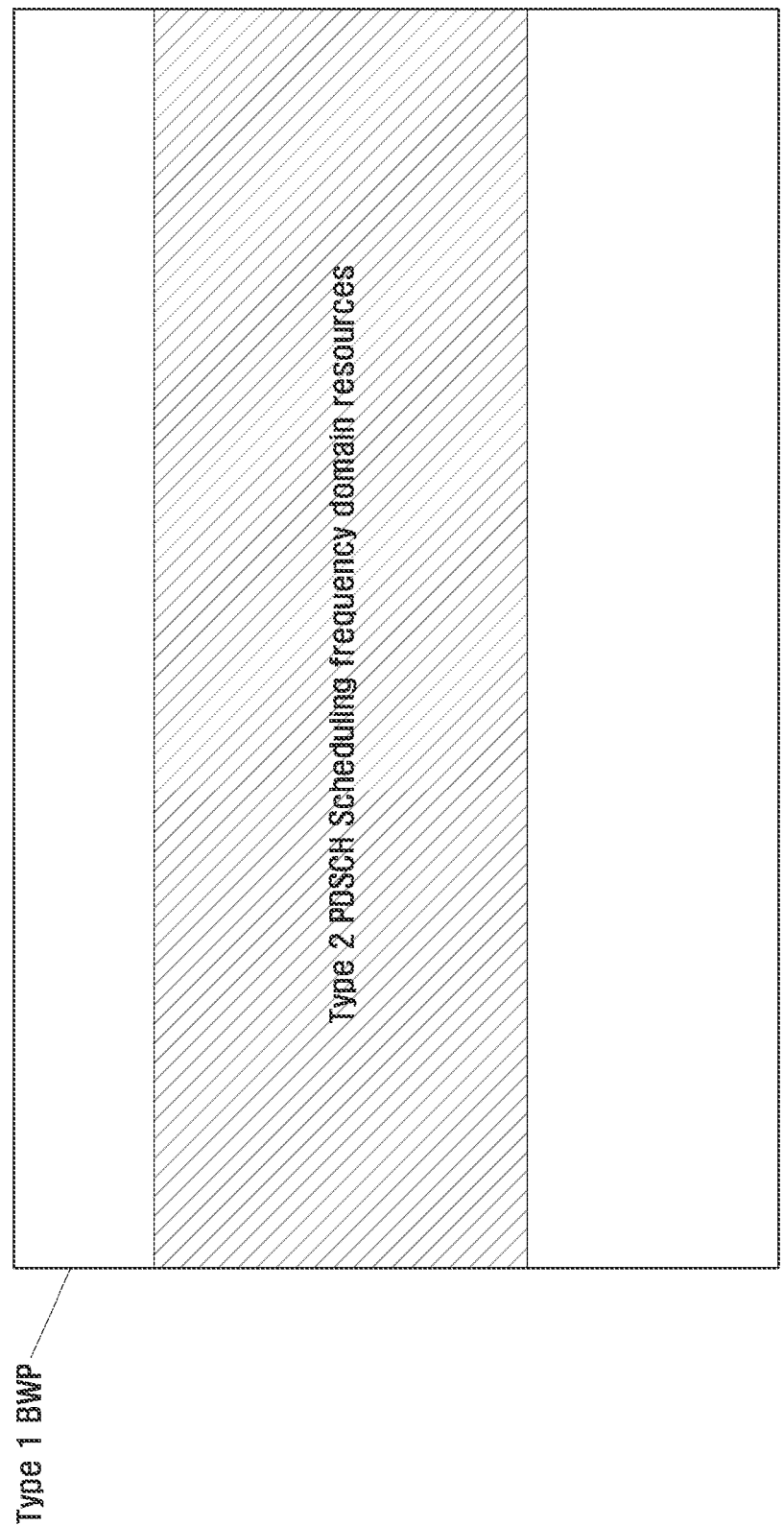
FIG. 7 shows a schematic diagram of a type 1 BWP and a type 2 PDSCH according to an embodiment of the disclosure.

FIG. 7 shows a schematic diagram of a type 1 BWP and a type 2 PDSCH according to an embodiment of the disclosure.

Referring to FIG. 7, the UE can receive the type 2 PDSCH contained in the type 1 BWP and the type 1 PDSCH contained in the type 1 BWP without BWP switching.

The UE may determine the frequency domain resources of the type 2 PDSCH by receiving the higher-layer signaling (e.g. radio resource control (RRC) signaling) configuration, and then determine the type 1 BWP containing the frequency domain resources of the type 2 PDSCH by receiving the higher-layer signaling configuration.

Figure 8:
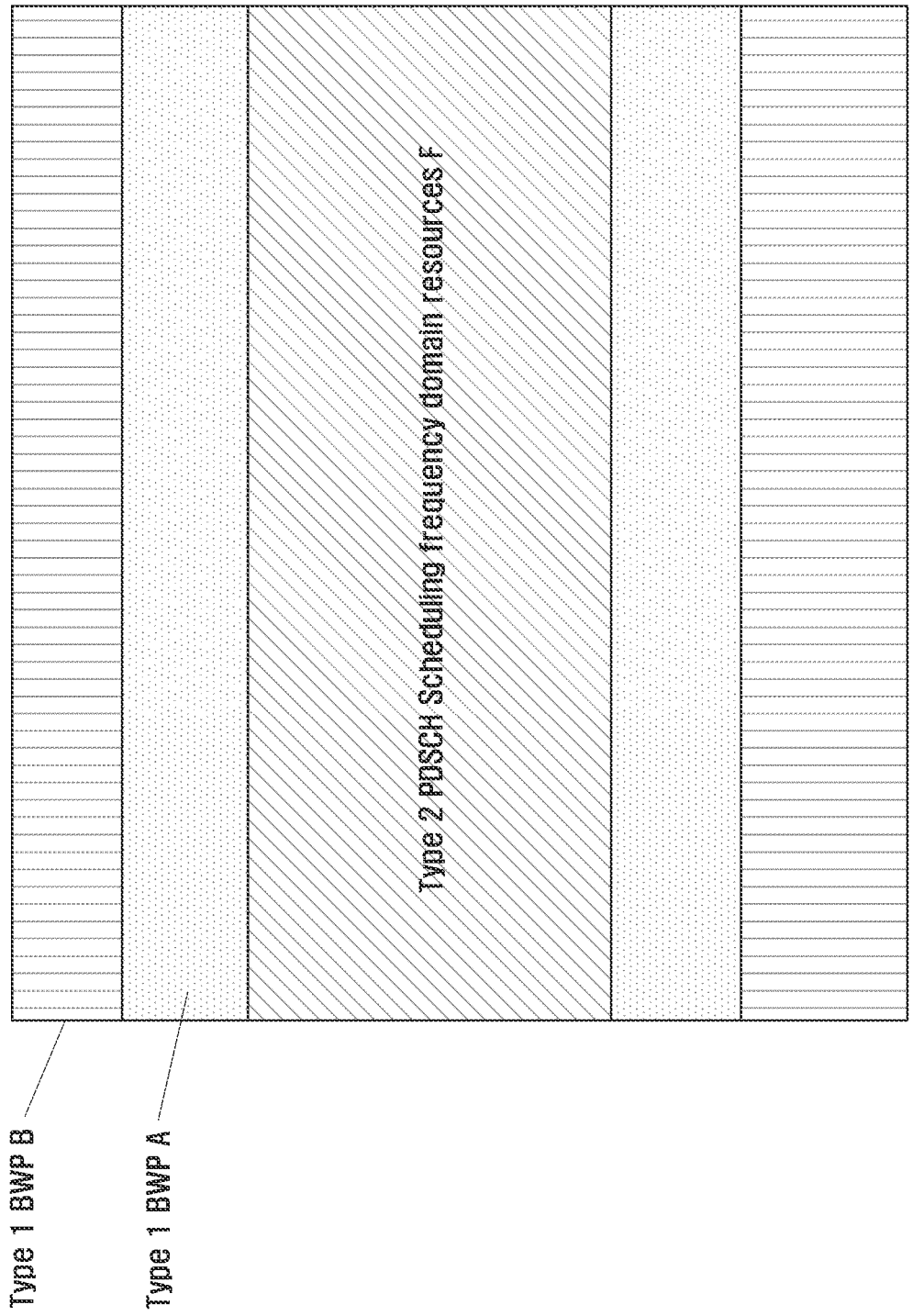
FIG. 8 shows a schematic diagram of a type 1 BWP and a type 2 PDSCH according to an embodiment of the disclosure.

FIG. 8 shows a schematic diagram of a type 1 BWP and a type 2 PDSCH according to an embodiment of the disclosure.

Referring to FIG. 8, the frequency domain resources of one type 2 PDSCH may be contained in more than one type 1 BWP, for example, the frequency domain resources F of one type 2 PDSCH are contained in a type 1 BWP A and a type 1 BWP B. And the frequency domain resource F of the type 2 PDSCH is unchanged when the active BWP of UE is switched from the type 1 BWP A to the type 1 BWP B.

The configuration information of the type 2 SPS PDSCH is configured according to the frequency domain resources of the type 2 PDSCH. And the configuration of the type 2 SPS PDSCH in the frequency domain resources F of the type 2 PDSCH remains unchanged, when the active BWP of UE is switched from the type 1 BWP A to the type 1 BWP B. The advantage of this method is that the signaling overhead of configuring the type 2 PDSCH can be reduced. The configuration information of the type 1 SPS PDSCH is configured according to the type 1 BWP.

Figure 9:
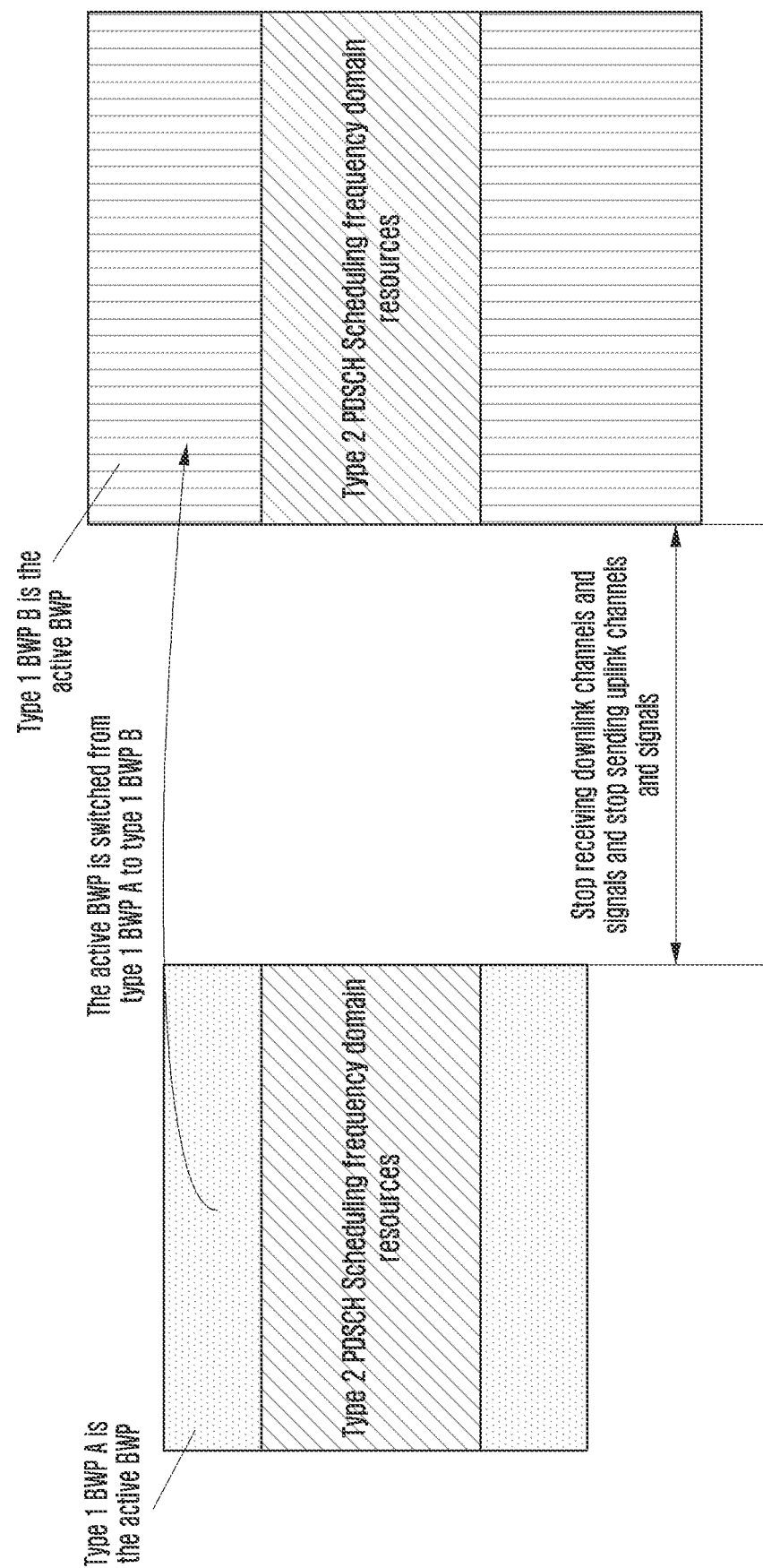
FIG. 9 shows a schematic diagram of the switching of a type 1 BWP according to an embodiment of the disclosure.

FIG. 9 shows a schematic diagram of the switching of a type 1 BWP according to an embodiment of the disclosure.

Referring to FIG. 9, when the active BWP of UE is switched from the type 1 BWP A to the type 1 BWP B, in order to adapt to the change of frequency domain configuration, the UE may stop receiving downlink channels and signals and stop sending uplink channels and signals within a certain period.

If the type 2 SPS PDSCH has been activated and it has not been deactivated (which is also called as released) before the active BWP of UE is switched from the type 1 BWP A to the type 1 BWP B, when the active BWP of UE is switched from the type 1 BWP A to the type 1 BWP B, after UE stops receiving the type 2 SPS PDSCH within a certain time period, UE continues to receive the type 2 SPS PDSCH according to the configuration information of the type 2 SPS PDSCH and the activation scheduling of the type 2 SPS PDSCH, and it is not necessary to wait for the activation of the type 2 SPS PDSCH to be received again before receiving the type 2 SPS PDSCH.

Figure 10:
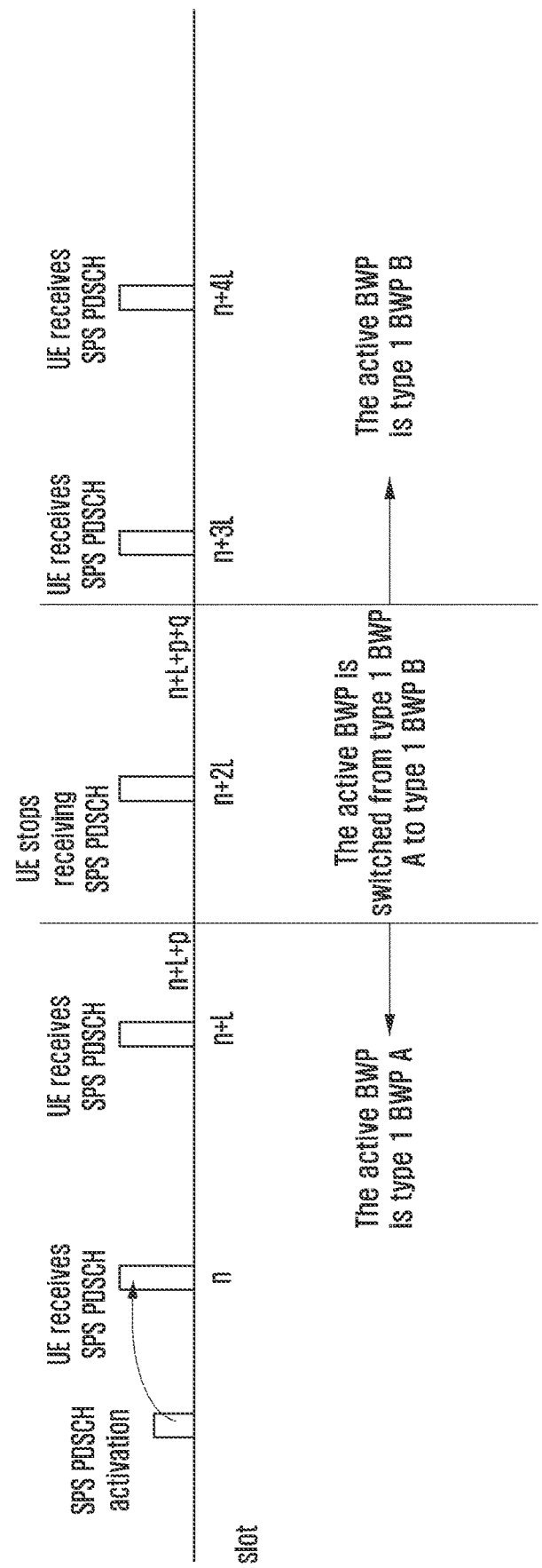
FIG. 10 shows a schematic diagram of the switching of a type 1 BWP according to an embodiment of the disclosure.

FIG. 10 shows a schematic diagram of the switching of a type 1 BWP according to an embodiment of the disclosure.

Referring to FIG. 10, in time slot n, the active BWP of UE is the type 1 BWP A, and the UE receives the type 2 SPS PDSCH that activates DCI scheduling. The period of the type 2 SPS PDSCH is L. According to the configuration information of the type 2 SPS PDSCH, before the type 2 SPS PDSCH is released, the UE receives the type 2 SPS PDSCH in time slots n, n+L, n+2L, . . . . In time slots n+L+p, the UE receives the instruction that the active BWP is switched from the type 1 BWP A to the type 1 BWP B. During the time period from time slot n+L+p to time slot n+L+p+q, the UE stops receiving the type 2 SPS PDSCH, that is, the UE stops receiving the type 2 SPS PDSCH in time slot n+2L. After time slot n+L+p+q, the UE continues to receive the type 2 SPS PDSCH in time slot n+3L. The advantage of this method is that the UE does not need the base station to reactivate the type 2 SPS PDSCH, thus saving the scheduling overhead of activating the type 2 SPS PDSCH and the time delay of reactivating the type 2 SPS PDSCH.

If the type 1 SPS PDSCH has been activated and not released in BWP A before the active BWP of the UE is switched from the type 1 BWP A to the type 1 BWP B, the UE stops receiving the type 1 SPS PDSCH after the active BWP of the UE is switched from the type 1 BWP A to the type 1 BWP B.

In the second case, the type 2 PDSCH is located in the type 2 BWP, the type 1 PDSCH is located in the type 1 BWP, and the type 2 BWP is contained in the type 1 BWP, then the type 2 BWP and the type 1 BWP containing the type 2 BWP are called the pair of the type 2 BWP and the type 1 BWP.

The UE can determine the configuration of the type 2 BWP by receiving the higher-layer signaling configuration, and then determine the type 2 BWP paired with the type 1 BWP by receiving the higher-layer signaling configuration.

Figure 11:
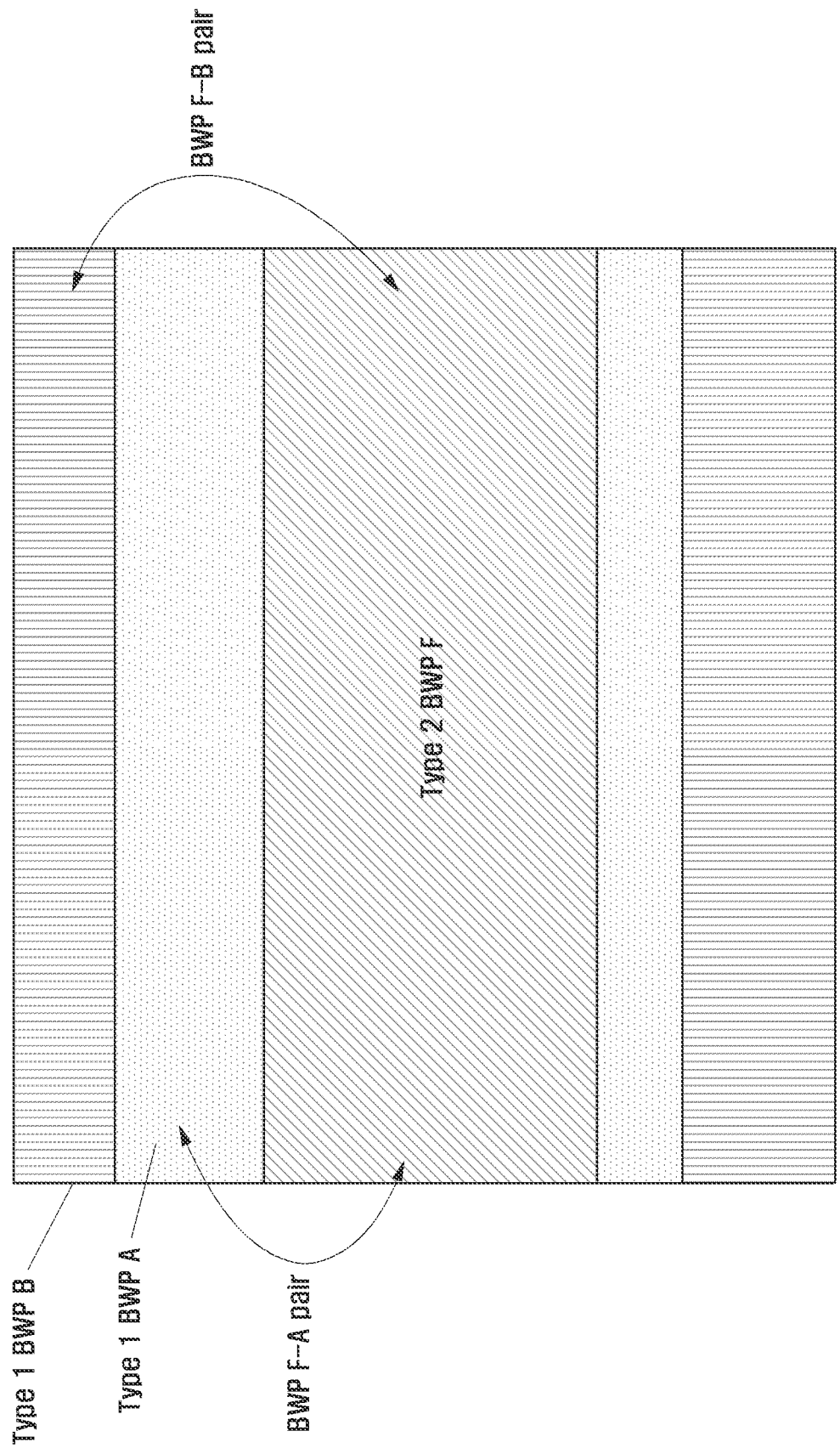
FIG. 11 shows a schematic diagram of a BWP pair and a type 2 PDSCH according to an embodiment of the disclosure.

FIG. 11 shows a schematic diagram of a BWP pair and a type 2 PDSCH according to an embodiment of the disclosure.

Referring to FIG. 11, one type 2 BWP F may be paired with more than one type 1 BWP. For example, one type 2 BWP F is paired with the type 1 BWP A and the type 1 BWP B to form a BWP F-A pair and a BWP F-B pair, respectively. When the active BWP of the UE is switched from BWP F-A pair to BWP F-B pair, the type 2 BWP F remains active.

The configuration information of the type 2 SPS PDSCH is configured according to the type 2 BWP F. When the active BWP of the UE is switched from BWP F-A pair to BWP F-B pair, the configuration of the type 2 SPS PDSCH in the type 2 BWP F remains unchanged. The advantage of this method is that the signaling overhead of configuring the type 2 SPS PDSCH can be reduced. The configuration information of the type 1 SPS PDSCH is configured according to the type 1 BWP.

Figure 12:
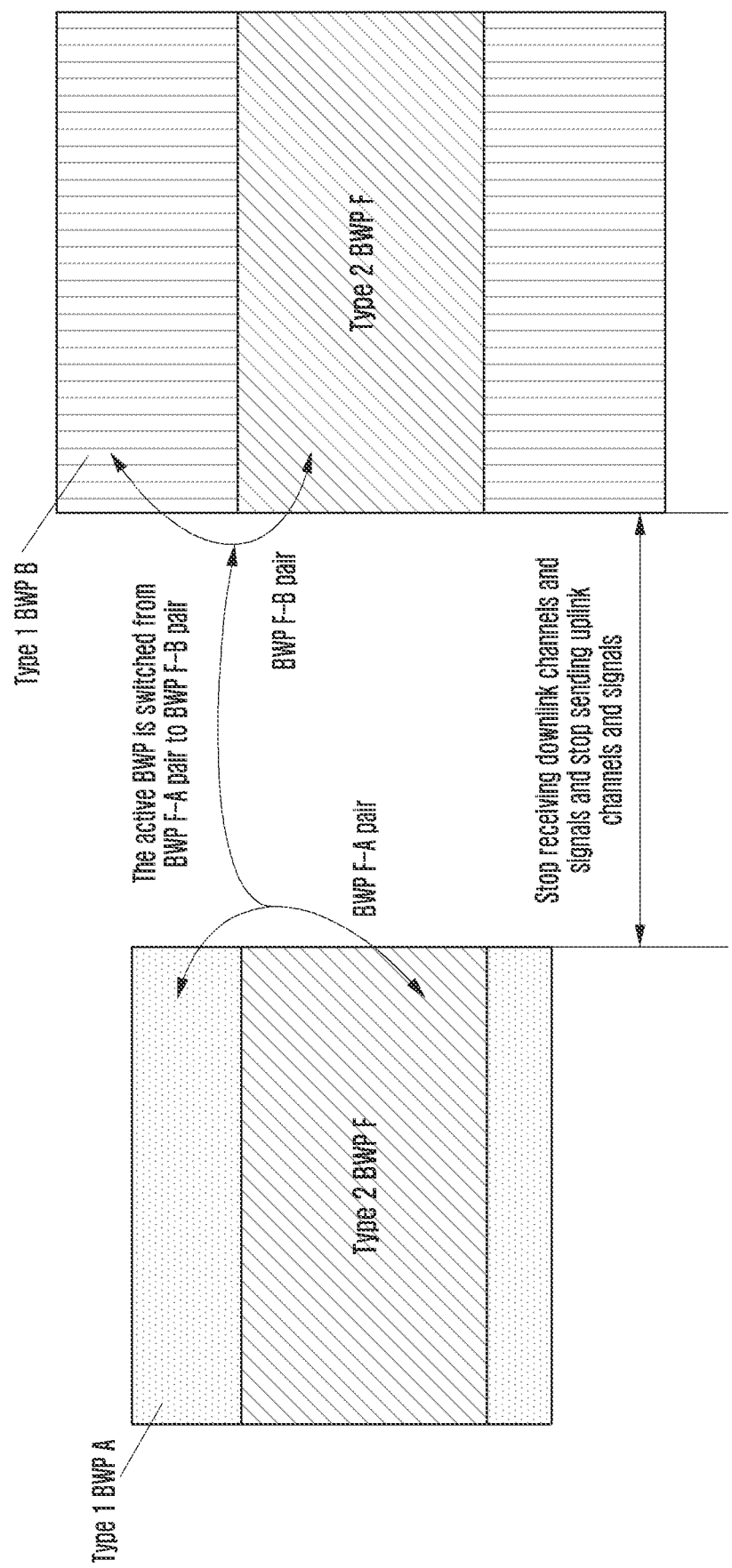
FIG. 12 shows a schematic diagram of the switching of BWP pairs according to an embodiment of the disclosure.

FIG. 12 shows a schematic diagram of the switching of BWP pairs according to an embodiment of the disclosure.

Referring to FIG. 12, when the active BWP of the UE is switched from BWP F-A pair to BWP F-B pair, in order to adapt to the change of frequency domain configuration, the UE should stop receiving downlink channels and signals and stop sending uplink channels and signals within a certain time period.

Figure 13:
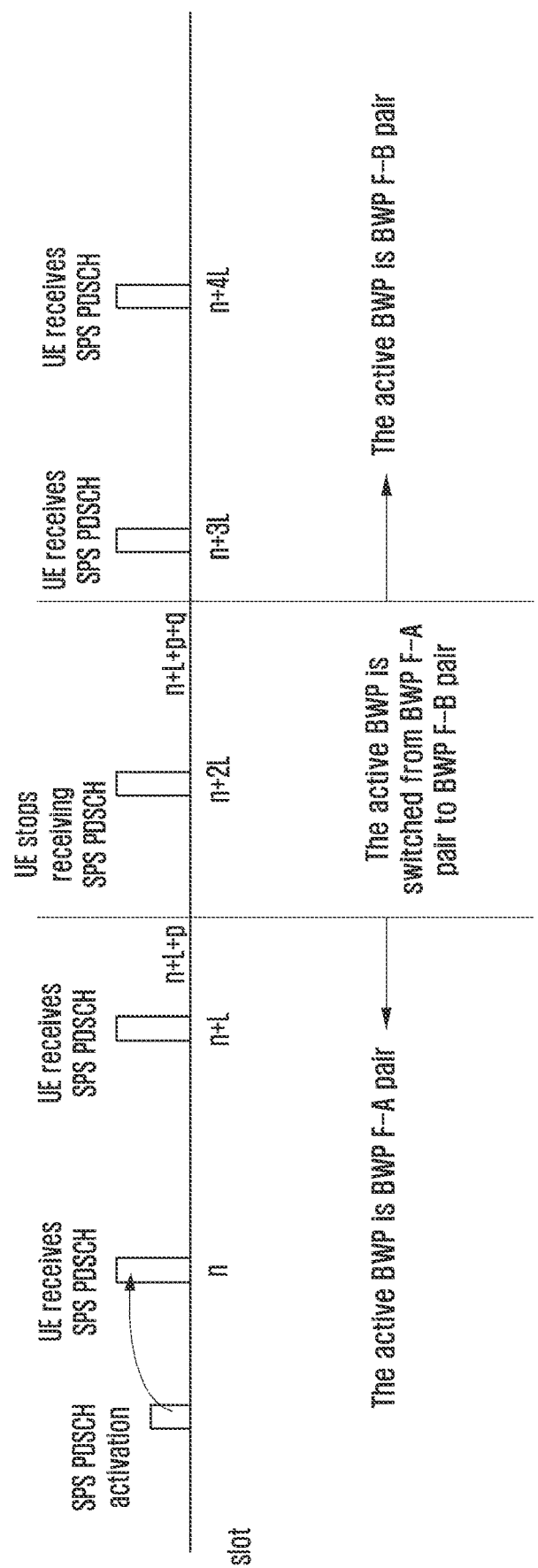
FIG. 13 shows a schematic diagram of the switching of BWP pairs according to an embodiment of the disclosure.

FIG. 13 shows a schematic diagram of the switching of BWP pairs according to an embodiment of the disclosure.

If the type 2 SPS PDSCH has been activated and not released before the active BWP of the UE is switched from BWP F-A pair to BWP F-B pair, when the active BWP of the UE is switched from the type 1 BWP F-A pair to the type 1 BWP F-B pair, after UE stops receiving the type 2 SPS PDSCH within a certain time period, UE continues to receive the type 2 SPS PDSCH according to the configuration information of the type 2 SPS PDSCH and the activation scheduling of the type 2 SPS PDSCH, and it is not necessary to wait for the activation of the type 2 SPS PDSCH to be received again before receiving the type 2 SPS PDSCH.

Referring to FIG. 13, in time slot n, the active BWP of the UE is the type 1 BWP F-A pair, and the UE receives the type 2 SPS PDSCH that activates DCI scheduling. The period of the type 2 SPS PDSCH is L. According to the configuration information of the type 2 SPS PDSCH, before the type 2 SPS PDSCH is released, the UE receives the type 2 SPS PDSCH in time slots n, n+L, n+2L, . . . . In time slots n+L+p, the UE receives the instruction that the active BWP is switched from the type 1 BWP F-A pair to the type 1 BWP F-B pair. During the time period from time slot n+L+p to time slot n+L+p+q, the UE stops receiving the type 2 SPS PDSCH, that is, the UE stops receiving the type 2 SPS PDSCH in time slot n+2L. After time slot n+L+p+q, the UE continues to receive the type 2 SPS PDSCH in time slot n+3L. The advantage of this method is that the UE does not need the base station to reactivate the type 2 SPS PDSCH, thus saving the scheduling overhead of activating the type 2 SPS PDSCH and the time delay of reactivating the type 2 SPS PDSCH.

If the type 1 SPS PDSCH has been activated in BWP A and has not been released before the active BWP of the UE is switched from BWP F-A pair to BWP F-B pair, the UE stops receiving the type 1 SPS PDSCH after the active BWP of the UE is switched from BWP F-A pair to BWP F-B pair.

There are two transmission modes for UE to transmit HARQ-ACK information of PDSCH. The first mode is to feed back negative-acknowledgement (NACK) on the determined PUCCH resources when the UE does not decode PDSCH correctly, and not feed back HARQ-ACK information when the UE decodes PDSCH correctly, and the first mode is called NACK only mode (NACK-only based feedback). The second mode is to feed back ACK on the determined PUCCH resources when the UE correctly decodes the PDSCH, and feed back NACK on the determined PUCCH resources when the PDSCH is not correctly decoded, and the second mode is called the ACK/NACK mode (ACK/NACK based feedback).

There are several methods for transmission of HARQ-ACK information of the type 2 SPS PDSCH.

Method 1

Figure 14:
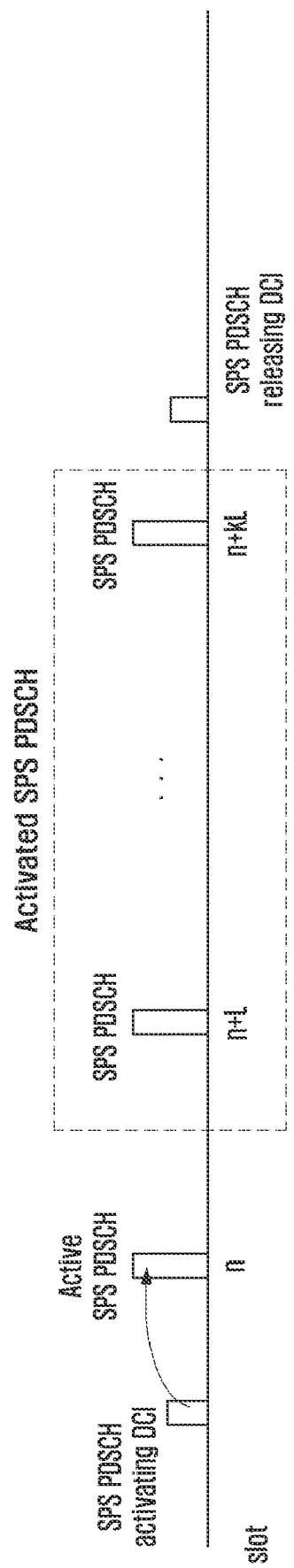
FIG. 14 shows a schematic diagram of the HARQ-ACK information of active SPS PDSCH, the HARQ-ACK information of activated SPS PDSCH and the HARQ-ACK information of SPS PDSCH releasing DCI according to an embodiment of the disclosure.

FIG. 14 shows a schematic diagram of the HARQ-ACK information of active SPS PDSCH, the HARQ-ACK information of activated SPS PDSCH and the HARQ-ACK information of SPS PDSCH releasing DCI according to an embodiment of the disclosure.

The transmission modes of HARQ-ACK information of the type 2 PDSCH and the type 2 SPS PDSCH can be determined independently. For example, the transmission modes of HARQ-ACK information of the type 2 PDSCH and the type 2 SPS PDSCH are determined by independent higher-layer signaling configurations.

Referring to FIG. 14, UE receives higher-level signaling configuration in order to (1) configure the transmission mode of HARQ-ACK information of the type 2 PDSCH to be NACK only mode, and (2) configure the transmission mode of HARQ-ACK information of the type 2 SPS PDSCH to be ACK/NACK mode. Among the others, the HARQ-ACK information of the type 2 SPS PDSCH includes HARQ-ACK information of active SPS PDSCH (that is, SPS PDSCH scheduled by DCI), HARQ-ACK information of activated SPS PDSCH (SPS PDSCH not scheduled by DCI) and HARQ-ACK information of SPS PDSCH releasing DCI.

Method 2

The HARQ-ACK information of the type 2 PDSCH and the activated type 2 SPS PDSCH (SPS PDSCH not scheduled by DCI) adopts the same transmission mode of HARQ-ACK information. For example, UE receives higher-level signaling configuration to configure the transmission mode of HARQ-ACK information of the type 2 PDSCH and the activated type 2 SPS PDSCH to be NACK only mode, while the HARQ-ACK information of the active type 2 SPS PDSCH (that is, the type 2 SPS PDSCH scheduled by DCI) and the HARQ-ACK information of the type 2 SPS PDSCH releasing DCI adopt the ACK/NACK mode. When the base station does not know that the UE has not detected the DCI for active SPS PDSCH and SPS PDSCH released DCI, this causes the UE to fail to receive SPS PDSCH. This method can prevent the UE from not detecting the DCI for active SPS PDSCH and the SPS PDSCH releasing DCI, so that a problem that the UE fails to receive SPS PDSCH can be solved.

Activation of the type 2 SPS PDSCH can be achieved by scheduling the DCI format of the type 2 PDSCH, and the scrambled CRC of the DCI format is the first RNTI, for example, G-RNTI or G-CS-RNTI.

Alternatively, for the activation of the type 2 SPS PDSCH, the type 2 SPS PDSCH can be activated by scheduling the DCI format of the type 1 PDSCH. The RNTI of the scrambled CRC of the DCI format is a UE specific RNTI, which can be C-RNTI, MCS-C-RNTI, or CS-RNTI. At this time, the PDSCH is the type 2 SPS PDSCH, that is, the PDSCH is received by multiple UEs. The RNTI in the initial value generated by the scrambling sequence of the type 2 SPS PDSCH is a value common to the multicast or broadcast UEs. For example, one parameter G-CS-RNTI is configured through protocol or higher-level signaling to replace the RNTI in $c_{init}=n_{RNTI} \cdot 2^{15}+q \cdot 2^{14}+n_{ID}$ to obtain the initial value generated by the scrambling sequence for the broadcast or multicast SPS PDSCH, wherein $n_{RNTI}$ is the Radio Network Temporary Identifier (RNTI) of UE. Among the others, $n_{ID}$ can be configured by higher-level signaling. If $n_{ID}$ is not configured, $n_{ID}=N_{ID}^{cell}$, wherein $N_{ID}^{cell}$ is the identification of the service cell and q is the serial number of the codeword.

When the DCI for scheduling the active broadcast/multicast SPS PDSCH and the DCI for scheduling the active unicast SPS PDSCH adopt the same format, indication information can be added in the DCI to indicate whether the scheduled SPS PDSCH is a broadcast/multicast SPS PDSCH or a unicast SPS PDSCH. If the SPS PDSCH is a broadcast/multicast PDSCH, the initial value generated by the scrambling sequence is obtained according to the G-RNTI. And if the PDSCH is a unicast SPS PDSCH, the initial value generated by the scrambling sequence is obtained according to the CS-RNTI. This indication information can be 1 bit. For example, when the bit value is "0", the SPS PDSCH is a broadcast/multicast PDSCH, and when the bit value is "1", the SPS PDSCH is a unicast PDSCH. Alternatively, the HARQ process number field in the DCI of the active SPS PDSCH can be scheduled to indicate whether the active SPS PDSCH is the type 1 SPS PDSCH or the type 2 SPS PDSCH, and which type 1 SPS PDSCH or which type 2 SPS PDSCH. For example, the corresponding relationship between the HARQ process number and the active type 2 SPS PDSCH and/or the type 1 SPS PDSCH is shown in Table 1. It should be noted that the values of the parameters in Table 1 are only examples, and can also be other values, which is not limited by the disclosure. The corresponding relationship between the HARQ process number and the active type 2 SPS PDSCH and/or the type 1 SPS PDSCH can also be configured and/or modified according to the higher-level signaling.

TABLE 1

| HARQ process number | Active SPS PDSCH type |
|---|---|
| 000 | The type 2 SPS PDSCH configured by the higher-level signaling |
| 001 | The first the type 1 SPS PDSCH configured by the higher-level signaling |
| 010 | The second the type 1 SPS PDSCH configured by the higher-level signaling |

TABLE 1-continued

| HARQ process number | Active SPS PDSCH type |
|---|---|
| 011 | The third the type 1 SPS PDSCH configured by the higher-level signaling |
| 100 | The fourth the type 1 SPS PDSCH configured by the higher-level signaling |
| 101 | The fifth the type 1 SPS PDSCH configured by the higher-level signaling |
| 110 | The sixth the type 1 SPS PDSCH configured by the higher-level signaling |
| 111 | The seventh the type 1 SPS PDSCH configured by the higher-level signaling |

When the RNTI of the scrambled CRC is in a DCI format of the UE specific RNTI (for example, the RNTI is CS-RNTI) and the type 1 SPS PDSCH is active, the RNTI in the initial value generated by the scrambling sequence of the type 1 SPS PDSCH is CS-RNTI. When the RNTI of the scrambled CRC is in a DCI format of the UE specific RNTI (for example, the RNTI is CS-RNTI) and the type 2 SPS PDSCH is active, the RNTI in the initial value generated by the scrambling sequence of the type 2 SPS PDSCH is G-CS-RNTI. After adopting this method, the DCI of the UE specific search space can be used to activate the multicast SPS PDSCH, which increases the flexibility of multicast SPS PDSCH activation, and the active multicast SPS PDSCH is an activated SPS PDSCH for other UEs. Therefore, $n_{RNTI}$ in the initial value generated by the scrambling sequence of the SPS PDSCH is G-CS-RNTI, so that other UEs can also receive it correctly.

The deactivation, also called release, of the type 2 SPS PDSCH can be achieved by scheduling the DCI format of the type 2 PDSCH, and the scrambled CRC of the DCI format is the first RNTI, for example, G-RNTI (G-RNTI is the CRC used to scramble the scheduled DCI of the type 2 PDSCH). When the RNTI of the scrambled CRC of the DCI for scheduling the type 2 PDSCH and the RNTI of the scrambled CRC of the DCI for activating the type 2 SPS PDSCH are both G-RNTI, the use indication field in the DCI is used to distinguish the DCI for scheduling the type 2 PDSCH or the DCI for activating the type 2 SPS PDSCH. And the indication field is, for example, 1 bit. On the other hand, the scrambled CRC of the deactivated DCI format of the type 2 SPS PDSCH could be the second RNTI, for example, G-CS-RNTI (G-CS-RNTI is the CRC used to scramble the scheduled DCI of the type 2 SPS PDSCH).

The deactivation, also called release, of the type 2 SPS PDSCH can be achieved by scheduling the DCI format of the type 1 PDSCH, and the scrambled CRC of the DCI format is the third RNTI, for example, CS-RNTI. And the deactivation of the type 2 SPS PDSCH and the type 1 SPS PDSCH can be performed simultaneously. For the combined deactivation of the type 2 SPS PDSCH and the type 1 SPS PDSCH, the field bits (for example, the HARQ process number field) in the DCI for deactivating the type 1 SPS PDSCH are used to indicate the indexes of the deactivated type 2 SPS PDSCH and the type 1 SPS PDSCH. The specific indication mode is shown in the Table 2, assuming that the HARQ process number has 3 bits. Table 2 shows the corresponding relationship between the HARQ process number and the deactivated type 2 SPS PDSCH and the type 1 SPS PDSCH.

TABLE 2

| HARQ process number | Deactivated type 2 SPS PDSCH and type 1 SPS PDSCH |
|---|---|
| 000 | The first the type 2 SPS PDSCH and the type 1 SPS PDSCH configuration configured by higher-layer signaling |
| 001 | The second the type 2 SPS PDSCH and the type 1 SPS PDSCH configuration configured by higher-layer signaling |
| 010 | The third the type 2 SPS PDSCH and the type 1 SPS PDSCH configuration configured by higher-layer signaling |
| 011 | The fourth the type 2 SPS PDSCH and the type 1 SPS PDSCH configuration configured by higher-layer signaling |
| 100 | The fifth the type 2 SPS PDSCH and the type 1 SPS PDSCH configuration configured by higher-layer signaling |
| 101 | The sixth the type 2 SPS PDSCH and the type 1 SPS PDSCH configuration configured by higher-layer signaling |
| 110 | The seventh the type 2 SPS PDSCH and the type 1 SPS PDSCH configuration configured by higher-layer signaling |
| 111 | The eighth the type 2 SPS PDSCH and the type 1 SPS PDSCH configuration configured by higher-layer signaling |

With this method, the UE specific DCI can be used to deactivate the multicast SPS PDSCH, which improves the reliability of deactivation.

Figure 15:
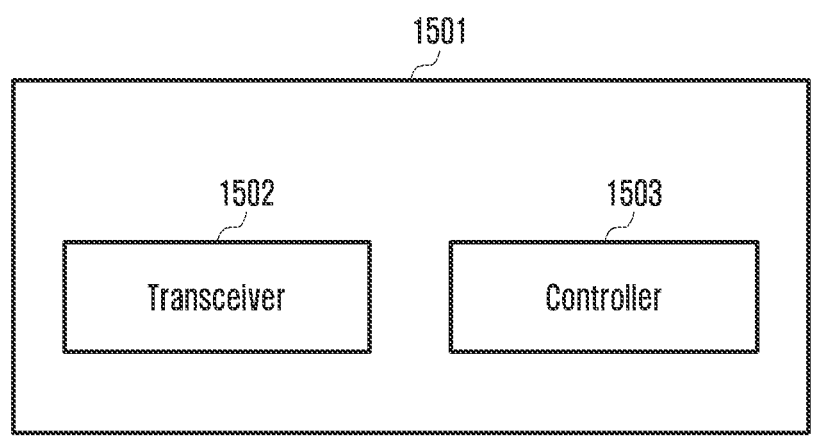
FIG. 15 shows a schematic diagram of user equipment that performs a physical downlink shared channel PDSCH receiving method according to an embodiment of the disclosure.

FIG. 15 shows a user equipment (UE) performing a method of receiving a physical downlink shared channel (PDSCH) according to an embodiment of the disclosure.

Referring to FIG. 15, the user equipment (UE) 1501 includes a transceiver 1502 configured to receive configuration information and bandwidth part configuration of SPS PDSCH, and a controller 1503 configured to receive SPS PDSCH based on switching indication information of BWP configuration and the configuration information of SPS PDSCH.

As used herein, "user equipment" or "UE" can refer to any terminal with wireless communication capability, including but not limited to mobile phones, cellular phones, smart phones or personal digital assistants (PDA), portable computers, image capturing devices such as digital cameras, game devices, music storage and playback devices, and any portable unit or terminal with wireless communication capability, or Internet facilities that allow wireless Internet access and browsing, etc.

As used herein, the terms "base station" (BS) or "network equipment" can refer to eNB, eNodeB, NodeB or base transceiver station (BTS) or gNB, etc., according to the used technology and terminology. Although the disclosure describes the operations from the UE side, it is obvious that the base station can also perform the operations corresponding the operations of the UE proposed in the disclosure.

The "memory" here may be of any type suitable for the technical environment herein, and can be implemented using any suitable data storage technology, including but not limited to semiconductor-based memory devices, magnetic memory devices and systems, optical memory devices and systems, fixed memory and mobile storage.

The processor here may be of any type suitable for the technical environment of this document, including but not limited to one or more of the following: general-purpose computers, special-purpose computers, microprocessors, digital signal processors DSPs, and processors based on a multi-core processor architecture.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that the various changes in form and details may be made therein without departing from the spirit and scope of the disclosure as defined by the appended claims and their equivalents.

What is claimed is:

1. A method performed by a user equipment (UE) in a communication system, the method comprising:
receiving, from a base station, a radio resource control (RRC) message including configuration information to indicate a feedback mode for a multicast semi- persistent scheduling (SPS) physical downlink shared channel (PDSCH) for a multicast data, the feedback mode being set to an acknowledgement (ACK)—negative-ACK (NACK) mode or a NACK only mode;
receiving, from the base station, downlink control information (DCI) for an activation of the SPS PDSCH for the multicast data;
in response to the activation of the SPS PDSCH for the multicast data, receiving, from the base station, a first SPS PDSCH for the multicast data based on the DCI; and
receiving, from the base station, a second SPS PDSCH for the multicast data after the first SPS PDSCH,
wherein a feedback mode of the second SPS PDSCH for the multicast data is determined based on the configuration information included in the RRC message, and
wherein the ACK-NACK mode is applied to a feedback of the first SPS PDSCH for the multicast data.

2. The method of claim 1, further comprising:
in case that the feedback mode is set to the NACK only mode and a physical uplink control channel (PUCCH) includes hybrid automatic repeat request (HARQ)-ACK information with a NACK value, transmitting, to the base station, the HARQ-ACK information with the NACK value.

3. The method of claim 1, further comprising:
in case that the feedback mode is set to the ACK-NACK mode and a transport block is decoded correctly, generating hybrid automatic repeat request (HARQ)-ACK information with an ACK value,
in case that the feedback mode is set to the ACK-NACK mode and a transport block is not decoded correctly, generating HARQ-ACK information with a NACK value.

4. The method of claim 1, further comprising:
receiving, from the base station, DCI for releasing the multicast-SPS PDSCH for the multicast data, wherein the ACK-NACK mode is applied to feedback the DCI for releasing the SPS PDSCH for the multicast data.

5. A method performed by a base station in a communication system, the method comprising:
transmitting, to a user equipment (UE), a radio resource control (RRC) message including configuration information to indicate a feedback mode for a multicast semi-persistent scheduling (SPS) physical downlink shared channel (PDSCH) for a multicast data, the feedback mode being set to an acknowledgement (ACK)—negative-ACK (NACK) mode or a NACK only mode;

transmitting, to the UE, downlink control information (DCI) for an activation of the SPS PDSCH for the multicast data;

in response to the activation of the SPS PDSCH for the multicast data, transmitting, to the UE, a first SPS PDSCH for the multicast data based on the DCI; and transmitting, to the UE, a second SPS PDSCH for the multicast data after the first SPS PDSCH, wherein a feedback mode of the second SPS PDSCH for the multicast data is determined based on the configuration information included in the RRC message, and wherein the ACK-NACK mode is applied to a feedback of the first SPS PDSCH for the multicast data.

6. The method of claim 5, further comprising:
in case that the feedback mode is set to the NACK only mode and a physical uplink control channel (PUCCH) includes hybrid automatic repeat request (HARQ)-ACK information with a NACK value, receiving, from the UE, the HARQ-ACK information with the NACK value.

7. The method of claim 5,
wherein in case that the feedback mode is set to the ACK-NACK mode and a transport block is decoded correctly, hybrid automatic repeat request (HARQ)-ACK information with an ACK value is generated, and
wherein in case that the feedback mode is set to the ACK-NACK mode and a transport block is not decoded correctly, HARQ-ACK information with a NACK value is generated.

8. The method of claim 5, further comprising:
transmitting, to the UE, DCI for releasing the SPS PDSCH for the multicast data; and
wherein the ACK-NACK mode is applied to feedback the DCI for releasing the SPS PDSCH for the multicast data.

9. A user equipment (UE) in a communication system, the UE comprising:
a transceiver; and
a controller coupled with the transceiver, the controller configured to:
receive, from a base station, a radio resource control (RRC) message including configuration information to indicate a feedback mode for a multicast semi-persistent scheduling (SPS) physical downlink shared channel (PDSCH) for a multicast data the feedback mode being set to an acknowledgement (ACK)—negative-ACK (NACK) mode or a NACK only mode,
receive, from the base station, downlink control information (DCI) for activation of the SPS PDSCH for the multicast data,
in response to the activation of the SPS PDSCH for the multicast data. receive, from the base station, a first SPS PDSCH for the multicast data based on the DCI, and
receive, from the base station, a second SPS PDSCH for the multicast data after the first SPS PDSCH,
wherein a feedback mode of the second SPS PDSCH for the multicast data is determined based on the configuration information included in the RRC message, and
wherein the ACK-NACK mode is applied to a feedback of the first SPS PDSCH for the multicast data.

10. The UE of claim 9, wherein the controller is further configured to:
in case that the feedback mode is set to the NACK only mode and a physical uplink control channel (PUCCH) includes hybrid automatic repeat request (HARQ)-ACK information with a NACK value, transmit, to the base station, the HARQ-ACK information with the NACK value.

11. The UE of claim 9, wherein the controller is further configured to:
in case that the feedback mode is set to the ACK-NACK mode and a transport block is decoded correctly, generate hybrid automatic repeat request (HARQ)-ACK information with an ACK value, and
in case that the feedback mode is set to the ACK-NACK mode and a transport block is not decoded correctly, generate HARQ-ACK information with a NACK value.

12. The UE of claim 9, wherein the controller is further configured to:
receive, from the base station, DCI for releasing the SPS PDSCH for the multicast data; and
wherein the ACK-NACK mode is applied to feedback the DCI for releasing the SPS PDSCH for the multicast data.

13. A base station in a communication system, the base station comprising:
a transceiver; and
a controller coupled with the transceiver, the controller configured to:
transmit, to a user equipment (UE), a radio resource control (RRC) message including configuration information to indicate a feedback mode for a multicast semi-persistent scheduling (SPS) physical downlink shared channel (PDSCH) for a multicast data, the feedback mode being set to an acknowledgement (ACK)—negative-ACK (NACK) mode or NACK only mode,
transmit, to the UE, downlink control information (DCI) for an activation of the SPS PDSCH for the multicast data,
in response to the activation of the SPS PDSCH for the multicast data, transmit, to the UE, a first SPS PDSCH for the multicast data based on the DCI, and
transmit, to the UE, a second SPS PDSCH for the multicast data after the first SPS PDSCH,
wherein a feedback mode of the second SPS PDSCH for the multicast data is determined based on the configuration information included in the RRC message, and
wherein the ACK-NACK mode is applied to a feedback of the first SPS PDSCH for the multicast data.

14. The base station of claim 13, wherein the controller is further configured to:
in case that the feedback mode is set to the NACK only mode and a physical uplink control channel (PUCCH) includes hybrid automatic repeat request (HARQ)-ACK information with a NACK value, receive, from the UE, the HARQ-ACK information with the NACK value,
wherein in case that the feedback mode is set to the ACK-NACK mode and a transport block is decoded correctly, HARQ-ACK information with an ACK value is generated, and
wherein in case that the feedback mode is set to the ACK-NACK mode and a transport block is not decoded correctly, HARQ-ACK information with a NACK value is generated.

15. The base station of claim 13, wherein the controller is further configured to:
  transmit, to the UE, DCI for releasing the SPS PDSCH for the multicast data,
  wherein the ACK-NACK mode is applied to feedback the DCI for releasing the SPS PDSCH for the multicast data.

* * * * *